United States Patent [19]

Kohda et al.

[11] Patent Number: 4,900,641
[45] Date of Patent: Feb. 13, 1990

[54] RADIOGRAPHIC INTENSIFYING SCREEN

[75] Inventors: Katsuhiro Kohda, Kanagawa; Kenji Takahashi, Odawara, both of Japan

[73] Assignee: Fuji Photo Film Co., Ltd., Kanagawa, Japan

[21] Appl. No.: 196,768

[22] Filed: May 17, 1987

Related U.S. Application Data

[63] Continuation of Ser. No. 12,010, Feb. 6, 1987, abandoned.

[30] Foreign Application Priority Data

Feb. 7, 1986 [JP] Japan .................................. 61-25572
Apr. 19, 1986 [JP] Japan .................................. 61-90619

[51] Int. Cl.⁴ ...................... G01J 1/58; C09K 11/46; G01N 21/52
[52] U.S. Cl. .................................. 428/690; 428/791; 250/486
[58] Field of Search ............... 428/690, 691; 250/483, 250/486

[56] References Cited

U.S. PATENT DOCUMENTS

| | | |
|---|---|---|
| 4,138,361 | 2/1979 | Suys et al. |
| 4,246,485 | 1/1981 | Bossomaier et al. |
| 4,292,107 | 9/1981 | Tanaka et al. |
| 4,360,571 | 11/1982 | Rabatin |
| 4,415,471 | 11/1983 | Degenhardt ............... 428/691 X |
| 4,563,580 | 1/1986 | Ishizuka et al. ........... 428/690 X |
| 4,574,102 | 3/1986 | Arakawa et al. .......... 428/690 X |
| 4,645,721 | 2/1987 | Arakawa et al. .......... 428/690 |
| 4,661,419 | 4/1987 | Nakamura ................. 428/691 |

Primary Examiner—Nancy A. B. Swisher
Attorney, Agent, or Firm—Sixbey, Friedman, Leedom & Ferguson

[57] ABSTRACT

A radiographic intensifying screen comprising a support and a phosphor layer provided on the support which comprises a binder and a phosphor dispersed therein, characterized in that said phosphor is a phosphor containing iodine and that said phosphor layer contains a compound having an epoxy group and/or at least one compound selected from the group consisting of phosphites, organotin compounds and metal salts of organic acids.

9 Claims, 2 Drawing Sheets

RADIOGRAPHIC INTENSIFYING SCREEN

This application is a continuation of Ser. No. 012,010, filed Feb. 6, 1987, now abandoned.

BACKGROUND OF THE INVENTION

1. Field of the Invention

The present invention relates to a radiographic intensifying screen, and more particularly, to a radiographic intensifying screen employing a phosphor containing iodine.

2. Description of the Prior Art

In a variety of radiography such as medical radiography for diagnosis and industrial radiography for nondestructive inspection, a radiographic intensifying screen is generally employed in close contact with one or both surfaces of a radiographic film such as an X-ray film.

The radiographic intensifying screen has a basic structure comprising a support and a phosphor layer provided on one surface of the support. Further, a transparent protective film of a polymer material is generally provided on the free surface (surface not facing the support) of the phosphor layer to keep the phosphor layer from chemical deterioration or physical shock. The phosphor layer comprises a binder and phosphor particles dispersed therein. When excited with a radiation such as X-rays having passed through an object, the phosphor particles emit light of high luminance in proportion to the dose of the radiation. Accordingly, the radiographic film placed in close contact with the phosphor layer of the intensifying screen can be exposed sufficiently to form a radiation image of the object, even if the radiation is applied to the object at a relatively small dose.

It is desired that the radiographic intensifying screen has a high radiographic speed and provide an image of high quality (high sharpness, high graininess, etc.). Especially when the object is a human body, the radiographic speed of the intensifying screen is desired to be as high as possible to reduce the radiation dose applied to the object.

As a phosphor employed in the radiographic intensifying screen, there has been proposed phosphors containing iodine as a component thereof such as a divalent europium activated barium fluorohalide phosphor ($BaFX:Eu^{2+}$, in which X is I or a combination of I and Cl and/or Br), cesium iodide phosphors (CsI:Na, CsI:Tl), and a terbium and/or thulium activated rare earth oxyhalide phosphor (LnOX:Tb,Tm, in which Ln is at least one rare earth element selected from the group consisting of La, Y, Gd and Lu; X is I or a combination of I and F and/or Cl and/or Br).

However, when these phosphors containing iodine are used in the radiographic intensifying screen, the phosphor layer is liable to be colored yellow gradually because the iodine is liberated from the phosphor to produce an iodine molecule ($I_2$). Such yellowing of the phosphor layer causes a problem of prominently decreased radiographic speed in the intensifying screen.

SUMMARY OF THE INVENTION

An object of the present invention is to provide a radiographic intensifying screen improved in the radiographic speed.

The present invention provides a radiographic intensifying screen comprising a support and a phosphor layer provided on the support which comprises a binder and a phosphor dispersed therein, characterized in that said phosphor is a phosphor containing iodine and that said phosphor layer contains a compound having an epoxy group and/or at least one compound selected from the group consisting of phosphites, organotin compounds and metal salts of organic acids.

In the present specification, tin salts of organic acids are not included in the metal salts of organic acids.

In the present invention, the radiographic speed of a radiographic intensifying screen which employs a phosphor containing iodine as a phosphor component is remarkably enhanced, by incorporating into a phosphor layer thereof a compound having an epoxy group and/or at least one compound selected from the group consisting of phosphites, organotin compounds and metal salts of organic acids.

The present inventors have found that a phosphor layer tends to be colored yellow when an iodine-containing phosphor is used in a radiographic intensifying screen, and hence the light emitted by the phosphor, particularly the light in the blue region, is absorbed in the phosphor layer to extremely decrease the radiographic speed of the intensifying screen. Such yellowing of the phosphor layer is caused by the phenomena that the iodine is liberated in the form of $I_2$ molecule from the phosphor in a coating dispersion for the preaparation of the phosphor layer, and that the liberated iodine forms an $I_2$ molecule in the prepared phosphor layer, during the preparation of the intensifying screen.

According to the invention, to a coating dispersion for the preparation of the phosphor layer is added a compound having an epoxy group and/or at least one compound selected from the group consisting of phosphites, organotin compounds and metal salts of organic acids, whereby iodine liberated from the phosphor is trapped by these compounds so as to prevent the formation of $I_2$ molecule. Iodine liberated from the phosphor in the prepared phosphor layer is also trapped by these compounds and free from the formation of $I_2$ molecule. The reason is, in the case of the latter compounds, i.e., phosphites, organotin compounds and metal salts of organic acids, presumably that the compounds serve as a chelating agent for iodine to trap iodine effectively in a stable state. For instance, it is presumed that the liberated iodine atoms bind to tin in the organotin compound as a ligand to be in a prominently stable state. As a result, the phosphor layer is prevented from yellowing to obtain a radiographic intensifying screen having the high radiographic speed.

Especially, a radiographic intensifying screen in which the phosphor layer contains not only the compound having an epoxy group but also the compound selected from the group consisting of phosphites, organotin compounds and metal salts of organic acids is effectively prevented from deterioration (decrease of radiographic speed) with the passage of time and more enhanced in the radiographic speed.

When an epoxy resin is used as the compound having an epoxy group, the epoxy resin also serves as a binder in the same place, so that adhesion strength between a support and the phosphor layer can be enhanced as well as the improvement in the radiographic speed. It is included in the scope of the invention that whole the binder of the phosphor layer is an epoxy resin.

DETAILED DESCRIPTION OF THE INVENTION

Figure 1:
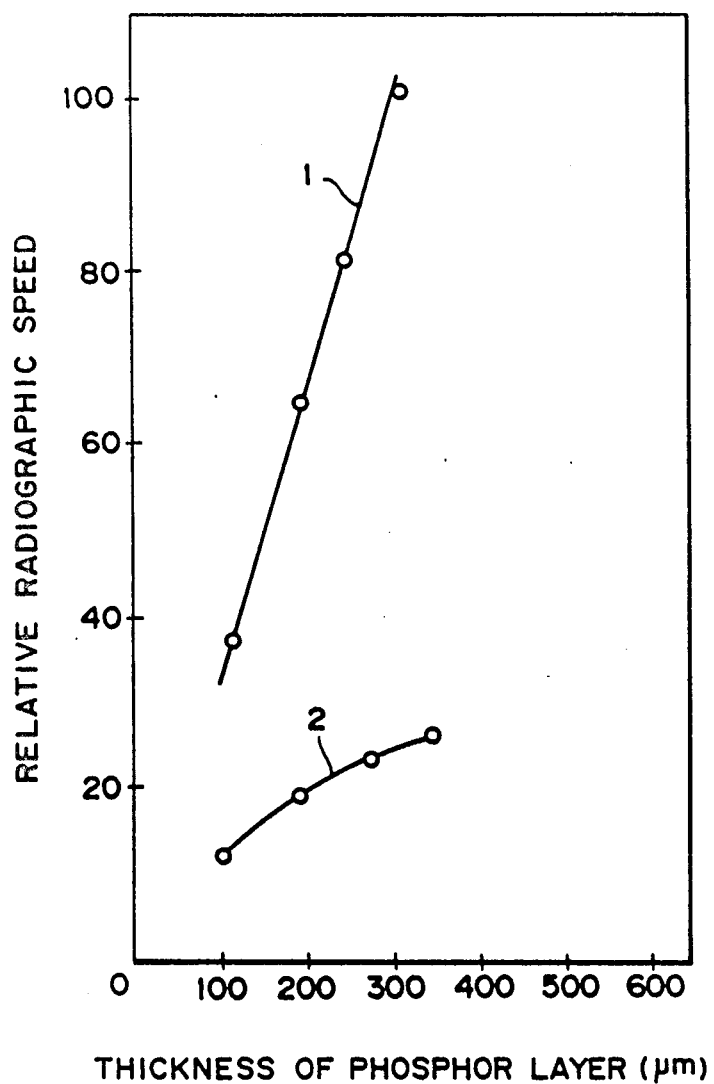
FIG. 1 is a graph showing relationships between a thickness of the phosphor layer and a relative radiographic speed, with respect to a radiographic intensifying screen containing a compound having an epoxy group according to the present invention (Curve 1) and a conventional radiographic intensifying screen (Curve 2).

The radiographic intensifying screen of the present invention having the above-described advantages can be prepared, for instance, in the following manner.

The support material employed in the present invention can be selected from those employed in the conventional radiogaphic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material. The plastic film may contain a light-absorbing material such as carbon black, or may contain a light-reflecting material such as titanium dioxide. The former is appropriate for preparing a high-sharpness type radiographic intensifying screen, while the latter is appropriate for preparing a high-speed type radiographic intensifying screen.

One or more additional layers may be occationally provided between the support and the phosphor layer, so as to enhance the bonding strength between the support and the phosphor layer, or to improve the radiographic speed of the screen or the quality of an image provided thereby. For instance, a subbing layer or an adhesive layer may be provided by coating a polymer material such as gelatin over the surface of the support on the phosphor layer-side. Otherwise, a light-reflecting layer and a light-absorbing layer may be provided by forming a polymer layer containing a light-reflecting material such as titanium dioxide or a light-absorbing material such as carbon black. In radiographic intensifying screens employed in the industrial raiography for non-destructive inspection, a metal foil is optionally provided on the phosphor layer-side surface of the support, so as to remove scattered radiation. Such a metal foil is chosen from lead foil, lead alloy foil, tin foil and the like.

As described in U.S. patent application No. 496,278, the phosphor layer-side surface of the support (or the surface of a subbing layer, a light-reflecting layer, a light-absorbing layer or a metal foil in the case that such layers are provided on the phosphor layer) may be provided with protruded and depressed portions.

On the support, a phosphor layer is formed.

The phosphor layer, that is a characteristic requisite of the invention, comprises a binder, a phosphor containing iodine, and a compound having an epoxy group and/or at least one compound selected from the group consisting of phosphites, organotin compounds and metal salts of organic acids, the latter two or three being dispersed in a binder.

The phosphor containing iodine which is employable in the invention contains iodine as a phosphor component. Namely, iodine is contained in the phosphor as at least one of a host component, an additive component and an activator component.

Examples of the iodine-containing phosphor employable in the radiographic intensifying screen of the invention include:

(1) a rare earth element activated alkaline earth metal fluorohalide phosphor having the formula: $(Ba_{1-x},M^{2+}_x)FX:yA$, in which $M^{2+}$ is at least one divalent metal selected from the group consisting of Mg, Ca, Sr, Zn and Cd; X is at least one element selected from the group consisting of Cl, Br and I; A is at least one element selected from the group consisting of Eu, Tb, Ce, Tm, Dy, Pr, Ho, Nd, Yb and Er; and x and y are numbers satisfying the conditions of $0 \leq x \leq 0.6$ and $0 \leq y \leq 0.2$, respectively, as described in U.S. Pat. No. 4,239,968;

The phosphor may contain the following additives:

$LiX'$, $BeX''_2$ and $M^{III}X'''_3$, in which each of $X'$, $X''$ and $X'''$ is at least one element selected from the group consisting of Cl, Br and I; and $M^{III}$ is a trivalent metal, as described in Japanese Patent Provisional Publication No. 56(1981)-74175;

metal oxides such as BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, as described in Japanese Patent Provisional Publication No. 55(1980)-160078;

Zr and Sc, as described in Japanese Patent Provisional Publication No. 56(1981)-116777;

B, as described in Japanese Patent Provisional Publication No. 57(1982)-23673;

As and Si, as described in Japanese Patent Provisional Publication No. 57(1982)-23675;

M.L, in which M is at least one alkali metal selected from the group consisting of Li, Na, K, Rb and Cs; and L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl, as described in U.S. patent application No. 497,805;

fired products of tetrafluoroboric acid compounds, as described in U.S. patent application No. 520,215;

fired products of monovalent or divalent metal salts of hexafluoro silicic acid, hexafluoro titanic acid and hexafluoro zirconic acid, as described in U.S. patent application No. 502,648;

$NaX'$, in which $X'$ is at least one element selected from the group consisting of Cl, Br and I, as described in Japanese Patent Provisional Publication No. 59(1984)-56479;

transition metals such as V, Cr, Mn, Fe, Co and Ni, as described in U.S. patent application No. 535,928;

$M^IX'$, $M^{II}X''_2$, $M^{III}X'''_3$ and A, in which $M^I$ is at least one alkali metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is metal oxide; and each of $X'$, $X''$ and $X'''$ is at least one halogen selected from the group consisting of F, Cl, Br and I, as described in U.S. patent application No. 543,326;

$M^IX'$, in which $M^I$ is at least one alkali metal selected from the group consisting of Rb and Cs; and $X'$ is at least one halogen selected from the group consisting of F, Cl, Br and I, as described in as described in U.S. patent application No. 668,464;

$M^{II}X'_2 \cdot M^{II}X''_2$, in which $M^{II}$ is at least one alkaline earth metal selected from the group consisting of Ba, Sr and Ca; and each of $X'$ and $X''$ is at least one halogen selected from the group consisting of Cl, Br and I, and $X \neq X'$, as described in U.S. patent application No. 754,424; and $LnX''_3$, in which Ln is at least one rare earth element selected from the group consisting of Sc, Y, La, Ce, Pr, Nd, Pm, Sm, Gd, Tb, Dy, Ho, Er, Tm, Yb and Lu; and $X''$ is at least one halogen selected from the group consisting of F, Cl, Br and I, as described in Japanese Patent Application No. 60(1985)-106752;

(2) a divalent europium activated alkaline earth metal halide phosphor having the formula: $M^{II}X_2 \cdot aM^{II}X'_2:x\text{-}Eu^{2+}$, in which $M^{II}$ is at least one alkaline earth metal selected from the group consisting of Ba, Sr and Ca; each of X and $X'$ is at least one halogen selected from the group consisting of Cl, Br and I, and $X \neq X'$; and a and x are numbers satisfying the conditions of $0.1 \leq a \leq 10.0$ and $0 < x \leq 0.2$, respectively, as described in U.S. patent application No. 660,987;

The phosphor may contain the following additives:

$M^IX''$, in which $M^I$ is at least one alkali metal selected from the group consisting of Rb and Cs; and $X''$ is at least one halogen selected from the group consisting of F, Cl, Br and I, as described in U.S. patent application No. 699,325;

$KX''$, $MgX'''_2$ and $M^{III}X''''_3$, in which $M^{III}$ is at least one trivalent metal selected from the group consisting of Sc, Y, La, Gd and Lu, and each of $X''$, $X'''$ and $X''''$ is at least one halogen selected from the group consisting of F, Cl, Br and I, as described in U.S. patent application No. 723,819;

B, as described in U.S. patent application No. 727,974;

oxides such as $SiO_2$ and $P_2O_5$, as described in U.S. patent application No. 727,972;

$LiX''$ and $NaX''$, in which $X''$ is at least one halogen selected from the group consisting of F, Cl, Br and I, as described in U.S. patent application No. 797,972;

SiO, as described in U.S. patent application No. 797,971;

$SnX''_2$, in which $X''$ is at least one halogen selected from the group consisting of F, Cl, Br and I, as described in U.S. patent application No. 797,971;

$CsX''$ and $SnX'''_2$, in which each of $X''$ and $X'''$ is at least one halogen selected from the group consisting of F, Cl, Br and I, as described in U.S. patent application No. 850,715; and $CsX''$ and $Ln_{3+}$, in which $X''$ is at least one halogen selected from the group consisting of F, Cl, Br and I; and Ln is at least one rare earth element selected from the group consisting of Sc, Y, Ce, Pr, Nd, Sm, Gd, Tb, Dy, Ho, Er, Tm, Yb and Lu, as described in U.S. patent application No. 850,715;

(3) a terbium and/or thulium activated rare earth oxyhalide phosphor having the formula: LnOX:A, in which Ln is at least one element selected from the group consisting of La, Y, Gd and Lu; X is at least one element selected from the group consisting of F, Cl, Br and I; and A is at least one rare earth element selected from the group consisting of Tb and Tm; and (4) alkali metal iodide phosphors such as CsI:Na, CsI:Tl, NaI and KI:Tl.

Among the above-described phosphors, the divalent europium activated alkaline earth metal fluorohalide phosphor containing iodine, alkali metal iodide phosphor and terbium and/or thulium activated rare earth oxyhalide phosphor containing iodine are particularly preferred, because the phosphors show (spontaneous) emission of high luminance. These phosphors are given by no means to restrict the phosphor employable in the invention. Any other phosphors can also be employed, provided that the phosphor contains iodine as a phosphor component and emits light when excited with a radiation.

The compound having an epoxy group employable in the invention has at least one epoxy group

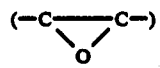

in a molecule.

The epoxy group-containing compound may be a monomer or a polymer. Examples of the monomer include 1,2-epoxypropane and 1,2-epoxybutane. Examples of the polymer include a bisphenol A-type epoxy resin having the formula:

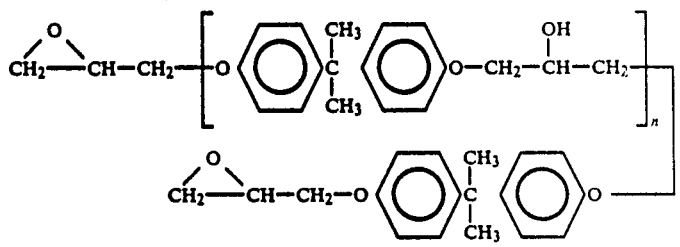

The epoxy group-containing compound is preferably a polymer, because the compound serves not only as an additive for the prevention of yellowing but also as a binder. Whole the binder may be the epoxy group-containing compound.

Representative examples of the phosphite (phosphorus chelate) employable in the invention include a compound having the formula (I) and a compound having the formula (II):

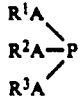

(I)

-continued

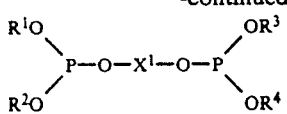
(II)

in which A is an oxygen atom or a sulfur atom; each of $R^1$, $R^2$, $R^3$ and $R^4$ is a hydrogen atom, an alkyl group or an aryl group, and $R^1$, $R^2$, $R^3$ and $R^4$ are the same or different from each other; and $X^1$ is a group comprising a carbon atom and/or an oxygen atom and/or a hydrogen atom.

Examples of the preferred phosphite include:

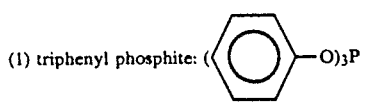

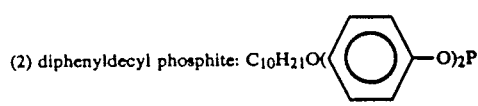

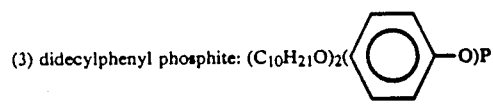

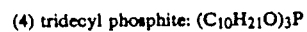

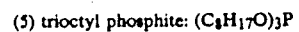

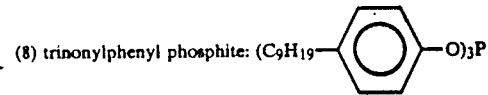

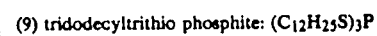

The above-mentioned compounds having the formula (I) and the formula (II) may be employed singly or in combination.

Examples of the organotin compound employable in the invention include a compound having the formula (III):

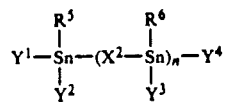
(III)

in which each of $R^5$ and $R^6$ is a hydrogen atom, an alkyl group or an aryl group, and $R^5$ and $R^6$ are the same or different from each other; each of $Y^1$, $Y^2$, $Y^3$ and $Y^4$ is an alkyl group, an aryl group, a fatty acid, a fatty acid derivative, mercaptan or a mercaptan carboxylic acid, and $Y^1$, $Y^2$, $Y^3$ and $Y^4$ are the same or different from each other; $X^2$ is an oxygen atom, a sulfur atom or a maleic acid; and n is 0 or an integer of not less than 1.

The organotin compound is relatively stabilized with readiness in such a state that a portion of organic ligands bound to tin substituted by halogen, etc. In the formula (III), at least one ligand of $Y^1$ to $Y^4$ is substituted by iodine to make the compound stable.

Examples of the preferred organotin compound include dioctyltin mercaptide, monobutyltin trimethylmaleate, monobutyltin trioctylmaleate, dibutyltin dilaurate, dibutyltin laurate methylmaleate, dibutyltin dioleilmaleate, dibutyltin dimethylmaleate, dibutyltin maleate, dibutyltin methoxymethylmaleate, a mixture of dibutyltin dimaleate and dibutyltin dimethylmaleate, dibutyltin dioctylmaleate, dibutyltin dioctylthioglycolate, dibutyltin dilaurylmercaptide, tribenzyltin octylmaleate and tribenzyltin trimethylmaleate.

Examples of the metal salt of organic acid employable in the invention include a compound having the formula (IV):

$$(R^7COO)_mM \qquad (IV)$$

in which $R^7$ is an alkyl group or an aryl group having 1-20 carbon atoms, which may have at least one substituent; M is calcium, zinc, cadmium or barium; and m is a positive integer.

It is presumed that a portion of organic acids in the metal salt of organic acid having the formula (IV), is substituted by iodine to form $(R^7COO)_{m-1}MI$. A tin salt of organic acid is not included in the metal salt of organic acid employable in the invention.

Examples of the organic acid in the metal salt of organic acid include octylic acid, lauric acid, stearic acid, oleic acid, ricinoleic acid, naphthenic acid, 2-ethylhexanoic acid, resin acid, synthetic carboxylic acid, benzoic acid, salicylic acid and organic phosphinous acid. The organic acid may be phenol or alkylphenol.

Examples of the metal salt of organic acid include so-called metallic soap such as barium stearate, barium laurate, barium ricinoleate, barium naphthenate, barium 2-ethylhexanoate, calcium stearate, calcium laurate, calcium ricinoleate, zinc stearate, zinc laurate, zinc ricinoleate and zinc 2-ethylhexanoate.

These phosphites, organotin compounds and metal salts of organic acids can be employed singly or in combination of two or more compounds.

The above-mentioned epoxy group-containing compound and at least one of the compound selected from the group consisting of phosphites, organotin compounds and metal salts of organic acids may be incorporated singly into the phosphor layer. Otherwise, both of the compounds may be appropriately incorporated into the phosphor layer.

The iodine liberated from the phosphor can be effectively trapped by these compounds, $I_2$ molecules are not produced and hence, the phosphor layer is free from yellowing. The employing of both the epoxy group-containing compound and the compound selected from phosphites, organotin compounds and metal salts of organic acids can more effectively reduce the deterioration (decrease of radiographic speed) with time.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth) acrylate, vinyl chloride-vinyl acetate copolymer, polyurethane, cellulose acetate butyrate, polyvinyl alcohol and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. Theses binders may be crosslinked with the crosslinking agent.

The phosphor layer can be formed on the support, for instance, in the following manner.

In the first place, the above-described phosphor containing iodine, compound for the prevention of yellowing and binder are added to an appropriate solvent, and they are well mixed to prepare a homogeneous coating dispersion comprising the phosphor particles and the compound dispersed in a binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion (the ratio between the epoxy group-containing compound and the phosphor in the case of whole the binder being said compound) may be determined according to the characteristics of the aimed radiographic intensifying screen, the nature of the phosphor employed, and the amount of the epoxy group-containing compound. Generally, the ratio therebetween is within the range of from 1:1 to 1:100 (binder:phosphor, by weight), preferably from 1:8 to 1:40.

The amount of the compound having an epoxy group varies depending upon the nature and amount of the employed phosphor, the kind of the binder, etc., and the amount thereof is generally in the range of 0.001 to 10% by weight, preferably 0.03 to 3% by weight, of the phosphor. When the amount is less than 0.001% by weight, there can be hardly obtained the yellowing-preventing effect. When the amount exceeds 10% by weight, even if whole the binder is the epoxy group-containing compound, unfavorable effects are given to the emission characteristics of the phosphor or various properties of the resulting intensifying screen such as flexibility and endurance, although the yellowing-preventing effect is obtained.

The amount of the phosphite, organotin compound and/or metal salt of organic acid also varies depending upon the nature and amount of the employed phosphor, the kind of the binder, etc., and generally is in the range of 0.0001 to 3% by weight, preferably in the range of 0.003 to 0.3% by weight, of the phosphor.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion prepared as described above is applied evenly to the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiographic intensifying screen, the nature of the phosphor, the ratio between the binder and the phosphor, etc. Generally, the thickness of the phosphor layer is within the range of from 200 $\mu$m to 1 mm, preferably from 50 to 500 $\mu$m.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

On the surface of the phosphor layer not facing the support, a transparent protective film may be provided to protect the phosphor layer from physical and chemical deterioration.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approx. 3 to 20 $\mu$m.

The radiographic intensifying screen may be covered on the side surfaces thereof with a polumer material to improve the mechanical strength such as resistance to shock and resistance to bending.

When the radiographic intensifying screen of the invention is provided with the above-described various layers such as a subbing layer, a light-reflecting layer, a protective film, an adhesive layer and a polymer film for covering the side surfaces thereof, it is preferable that these layers, particularly the layer next to the phosphor layer, contain the compound having an epoxy group and/or the compound selected from the group consisting of phosphites, organotin compounds and metal salts of organic acids.

The present invention will be illustrated by the following examples, but these examples by no means restrict the invention.

EXAMPLE 1

To 18 g. of methyl ethyl ketone were added 120 g. of a particulate divalent europium activated barium fluorobromide ($BaFBr_{0.85}I_{0.15}:0.001Eu^{2+}$) phosphor, 24 g. of a methyl ethyl ketone solution of unsaturated linear polyester (trade name: Vylon #500, available from Toyobo Co., Ltd.) (solid content: 10 wt.%), 6 g. of a methyl ethyl ketone solution of nitrocellulose (solid content: 10 wt.%) and 2 g. of a methyl ethyl ketone solution of bisphenol A-type epoxy resin having an average molecular weight of 900 (solid content: 50 wt.%). The mixture was sufficiently stirred by means of a propeller agitator to obtain a homogeneous coating dispersion having a mixing ratio of 1:40 (binder:phosphor, by weight) and a viscosity of 25–30 PS (at 25° C.).

The coating dispersion was applied evenly onto a polyethylene terephthalate sheet containing carbon black (support, thickness: 250 μm) placed horizontally on a glass plate. The application of the coating dispersion was carried out using a doctor blade with varying a diameter of the aperture of the doctor blade. After the coating was complete, the support having a layer of the coating dispersion was placed in an oven and heated at a temperature gradually rising from 25° to 100° C. Thus, a phosphor layer having various thickness in the range of 100 to 350 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiographic intensifying screen consisting essentially of a support, a phosphor layer and a transparent protective film was prepared.

COMPARISON EXAMPLE 1

The procedure of Example 1 was repeated except for not using the bisphenol A-type epoxy resin solution and using 20 g. of methyl ethyl ketone in the preparation of the coating dispersion, to prepare a radiographic intensifying screen consisting essentially of a support, a phosphor layer and a transparent protective film.

The radiographic intensifying screens obtained in Example 1 and Comparison Example 1 were exposed to X-rays at 80 KVp to measure the radiographic speed. The results are shown in FIG. 1.

FIG. 1 is a graph in which the thickness of the phosphor layer is plotted on the abscissa and the relative radiographic speed is plotted on the ordinate.

In FIG. 1,
Curve 1: screen containing epoxy group-containing compound (Example 1), and
Curve 2: screen not containing epoxy group-containing compound (Com. Example 1).

As is evident from FIG. 1, the radiographic intensifying screen wherein the epoxy-group containing compound is contained in the phosphor layer according to the invention (Example 1) was remarkably improved in the radiographic speed, as compared with the known radiographic intensifying screen not containing the epoxy-group containing compound (Comparison Example 1). The phosphor layer of the known intensifying screen extremely yellowed and the radiographic speed was enhanced only a little even when the thickness thereof was made larger. On the contrary, no yellowing was appeared in the phosphor layer of the intensifying screen of the invention and the radiographic speed increased in proportion to the thickness thereof.

EXAMPLE 2

The procedure of Example 1 was repeated except for using 120 g. of a particulate terbium and thulium activated lanthanum oxybromide (LaOBr$_{0.8}$I$_{0.2}$:0.01Tb,0.005Tm) phosphor as the phosphor and using 1 g. of 1,2-epoxypropane instead of the bisphenol A-type epoxy resin solution, to form a phosphor layer having a thickness of 250 μm on the support.

On the phosphor layer was formed a transparent protective film in the same manner as described in Example 1, to prepare a radiographic intensifying screen consisting essentially of a support, a phosphor layer and a transparent protective film.

COMPARISON EXAMPLE 2

The procedure of Example 2 was repeated except for not adding 1,2-epoxypropane to the coating dispersion, to prepare a radiographic intensifying screen consisting essentially of a support, a phosphor layer and a transparent protective film.

The radiographic intensifying screens obtained in Example 2 and Comparison Example 2 were measured on the radiographic speed in the same manner as described above. The results are set forth in Table 1. The radiographic speed of the intensifying screen was expressed by a relative value on the basis of that of Example 2 being 100.

TABLE 1

|  | Example 2 | Com. Example 2 |
| --- | --- | --- |
| Relative Radiographic Speed | 100 | 40 |

EXAMPLE 3

To 18 g. of methyl ethyl ketone were added 120 g. of a particulate divalent europium activated barium fluorobromide (BaFBr$_{0.85}$I$_{0.15}$:0.001Eu$^{2+}$) phosphor, 24 g. of a methyl ethyl ketone solution of unsaturated linear polyester (trade name: Vylon #500, available from Toyobo Co., Ltd.) (solid content: 10 wt.%), 6 g. of a methyl ethyl ketone solution of nitrocellulose (solid content: 10 wt.%) and 0.04 g. of a methyl ethyl ketone solution of diphenyldecyl phosphite having an average molecular weight of 374 (solid content: 50 wt.%). The mixture was sufficiently stirred by means of a propeller agitator to obtain a homogeneous coating dispersion having a mixing ratio of 1:40 (binder:phosphor, by weight) and a viscosity of 25–30 PS (at 25° C.).

The coating dispersion was applied evenly onto a polyethylene terephthalate sheet containing carbon black (support, thickness: 250 μm) placed horizontally on a glass plate. The application of the coating dispersion was carried out using a doctor blade with varying a diameter of the aperture of the doctor blade. After the coating was complete, the support having a layer of the coating dispersion was placed in an oven and heated at a temperature gradually rising from 25° to 100° C. Thus, a phosphor layer having various thickness in the range of 150 to 500 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiographic intensifying screen consisting essentially of a support, a phosphor layer and a transparent protective film was prepared.

COMPARISON EXAMPLE 3

The procedure of Example 3 was repeated except for not using the diphenyldecyl phosphite solution and using 20 g. of methyl ethyl ketone in the preparation of the coating dispersion, to prepare a radiographic intensifying screen consisting essentially of a support, a phosphor layer and a transparent protective film.

The radiographic intensifying screens obtained in Example 3 and Comparison Example 3 were measured on the radiographic speed in the same manner as described hereinbefore. The results are shown in FIG. 2.

Figure 2:
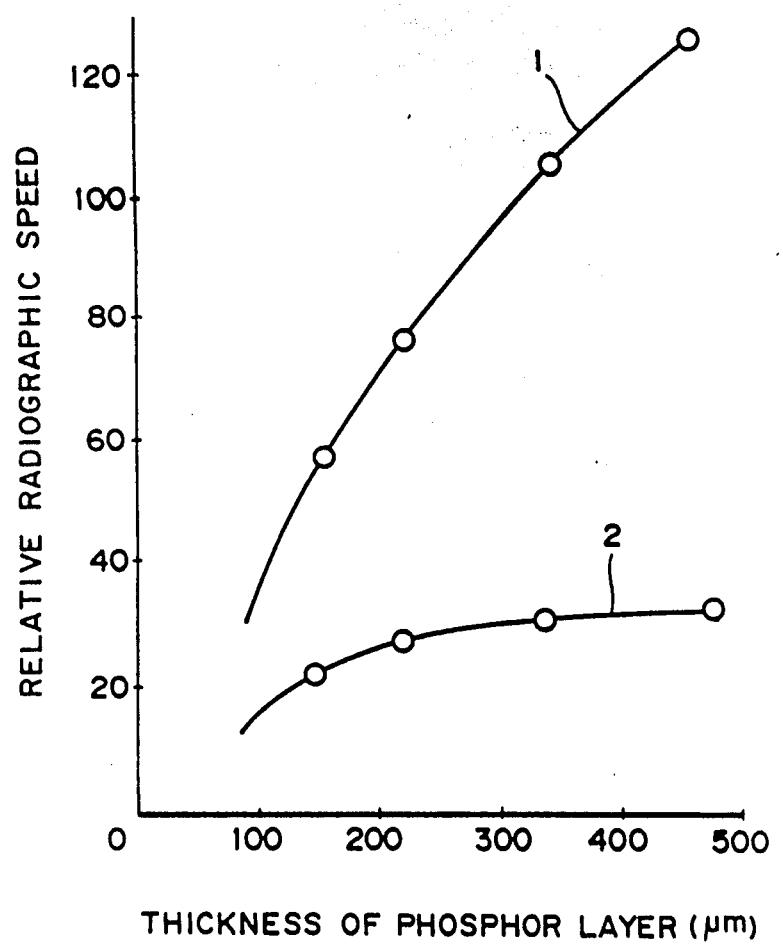
FIG. 2 is a graph showing relationships between a thickness of the phosphor layer and a relative radiographic speed, with respect to a radiographic intensifying screen containing a phosphite according to the present invention (Curve 1) and a conventional radiographic intensifying screen (Curve 2).

FIG. 2 is a graph in which the thickness of the phosphor layer is plotted on the abscissa and the relative radiographic speed is plotted on the ordinate.

In FIG. 2,

Curve 1: screen containing phosphite (Example 3), and

Curve 2: screen not containing phosphite (Com. Example 3).

As is evident from FIG. 2, the radiographic intensifying screen wherein phosphite is contained in the phosphor layer according to the invention (Example 3) was remarkably improved in the radiographic speed, as compared with the known radiographic intensifying screen not containing phosphite (Comparison Example 3). The phosphor layer of the known intensifying screen extremely yellowed and the radiographic speed was enhanced only a little even when the thickness thereof was made larger. On the contrary, no yellowing was appeared in the phosphor layer of the intensifying screen of the invention and the radiographic speed increased in proportion to the thickness thereof.

EXAMPLE 4

The procedure of Example 3 was repeated except for using 120 g. of a particulate terbium and thulium activated lanthanum oxybromide (LaOBr$_{0.8}$I$_{0.2}$:0.01Tb,0.005Tm) phosphor as the phosphor and using 0.04 g. of dioctyltin mercapto instead of the diphenyldecyl phosphite, to form a phosphor layer having a thickness of 250 μm on the support.

On the phosphor layer was formed a transparent protective film in the same manner as described in Example 3, to prepare a radiographic intensifying screen consisting essentially of a support, a phosphor layer and a transparent protective film.

COMPARISON EXAMPLE 4

The procedure of Example 4 was repeated except for not adding dioctyltin mercapto to the coating dispersion, to prepare a radiographic intensifying screen consisting essentially of a support, a phosphor layer and a transparent protective film.

The radiographic intensifying screens obtained in Example 4 and Comparison Example 4 were measured on the radiographic speed in the same manner as described above. The results are set forth in Table 2. The radiographic speed of the intensifying screen was expressed by a relative value on the basis of that of Example 4 being 100.

TABLE 2

|  | Example 4 | Com. Example 4 |
| --- | --- | --- |
| Relative Radiographic Speed | 100 | 30 |

EXAMPLE 5

The procedure of Example 3 was repeated except for using 120 g. of a particulate divalent europium activated barium chlorobromide (BaClBr$_{0.9}$I$_{0.1}$:0.001Eu$^{2+}$) phosphor as the phosphor and using 0.02 g. of zinc stearate and 0.02 g. of barium stearate instead of the diphenyldecyl phosphite, to form a phosphor layer having a thickness of 250 μm on the support.

On the phosphor layer was formed a transparent protective film in the same manner as described in Example 3, to prepare a radiographic intensifying screen consisting essentially of a support, a phosphor layer and a transparent protective film.

COMPARISON EXAMPLE 5

The procedure of Example 5 was repeated except for not adding zinc stearate and barium stearate to the coating dispersion, to prepare a radiographic intensifying screen consisting essentially of a support, a phosphor layer and a transparent protective film.

The radiographic intensifying screens obtained in Example 5 and Comparison Example 5 were measured on the radiographic speed in the same manner as described above. The results are set forth in Table 3. The radiographic speed of the intensifying screen was expressed by a relative value on the basis of that of Example 5 being 100.

TABLE 3

|  | Example 5 | Com. Example 5 |
| --- | --- | --- |
| Relative Radiographic Speed | 100 | 38 |

EXAMPLE 6

To 18 g. of methyl ethyl ketone were added 120 g. of a particulate divalent europium activated barium fluorobromide (BaFBr$_{0.85}$I$_{0.15}$:0.001Eu$^{2+}$) phosphor, 24 g. of a methyl ethyl ketone solution of an acrylic resion (solid content: 10 wt.%), 6 g. of a methyl ethyl ketone solution of nitrocellulose (solid content: 10 wt.%), 2 g. of a methyl ethyl ketone solution of bisphenol A-type epoxy resin having an average molecular weight of 900 (solid content: 50 wt.%), and 0.04 g. of a methyl ethyl ketone solution of diphenyldecyl phosphite having an average molecular weight of 374 (solid content: 50 wt.%). The mixture was sufficiently stirred by means of a propeller agitator to obtain a homogeneous coating dispersion having a mixing ratio of 1:40 (binder:phosphor, by weight) and a viscosity of 25-30 PS (at 25° C.).

The coating dispersion was applied evenly onto a polyethylene terephthalate sheet containing carbon black (support, thickness: 250 μm) placed horizontally on a glass plate by using a doctor blade. After the coating was complete, the support having a layer of the coating dispersion was placed in an oven and heated at a temperature gradually rising from 25° to 100° C. Thus, a phosphor layer having a thickness of approx. 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiographic intensifying screen consisting essentially of a support, a phosphor layer and a transparent protective film was prepared.

The radiographic intensifying screens obtained in Example 6 as well as Examples 1 and 3 were evaluated on the deterioration characteristics according to the following test.

The intensifying screen was measured on the radiographic speed in the same manner as described above. After the intensifying screen was allowed to stand at a temperature of 60° C. and at a humidity of 80%RH for 7 days, the intensifying screen was again measured on the radiographic speed.

The results are set forth in Table 4. The radiographic speed of each intensifying screen was expressed by a relative value on the basis of that of each intensifying screen before the standing being 100.

TABLE 4

|  | Relative Radiographic Speed | |
|---|---|---|
|  | Before Standing | After Standing |
| Example 1 | 100 | 85 |
| Example 3 | 100 | 80 |
| Example 6 | 100 | 90 |

As is evident from Table 4, the radiographic intensifying screen wherein both of phosphite and epoxy group-containing compound were contained in the phosphor layer according to the invention (Example 6) kept higher radiographic speed than the radiographic intensifying screen containing only epoxy group-containing compound (Example 1) and than the radiographic intensifying screen containing only phosphite (Example 3).

We claim:

1. A radiographic intensifying screen comprising a support and a phosphor layer provided on the support which comprises a binder and a phosphor dispersed therein, characterized in that said phosphor is a phosphor selected from the group consisting of divalent europium activated alkaline earth metal fluorohalide phosphors containing iodine and alkali metal iodide phosphors and that said phosphor layer contains a compound having an epoxy group and/or at least one compound selected from the group consisting of phosphites, organotin compounds and metal salts of organic acids.

2. The radiographic intensifying screen as claimed in claim 1, in which said compound having an epoxy group is contained in the phosphor layer in an amount of 0.001–10% by weight of the phosphor.

3. The radiographic intensifying screen as claimed in claim 2, in which said compound having an epoxy group is contained in the phosphor layer in an amount of 0.03–3% by weight of the phosphor.

4. The radiographic intensifying screen as claimed in claim 1, in which said compound having an epoxy group is at least one compound selected from the group consisting of 1,2-epoxypropane, 1,2-epoxybutane and an epoxy resin.

5. The radiographic intensifying screen as claimed in claim 1, in which said at least one compound selected from the group consisting of phosphites, organotin compounds and metal salts of organic acids is contained in the phosphor layer in an amount of 0.0001–3% by weight of the phosphor.

6. The radiographic intensifying screen as claimed in claim 5, in which said at least one compound selected from the group consisting of phosphites, organotin compounds and metal salts of organic acids is contained in the phosphor layer in an amount of 0.003–0.3% by weight of the phosphor.

7. The radiographic intensifying screen as claimed in claim 1, in which said phosphites are compounds having the formula (I) and compounds having the formula (II):

$$\begin{array}{c} R^1A \\ R^2A-P \\ R^3A \end{array} \quad (I)$$

$$\begin{array}{c} R^1O \\ R^2O \end{array} P-O-X^1-O-P \begin{array}{c} OR^3 \\ OR^4 \end{array} \quad (II)$$

in which A is an oxygen atom or a sulfur atom; each of $R^1$, $R^2$, $R^3$ and $R^4$ is a hydrogen atom, an alkyl group or an aryl group, and $R^1$, $R^2$, $R^3$ and $R^4$ are the same or different from each other; and $X^1$ is a group comprising a carbon atom and/or an oxygen atom and/or a hydrogen atom.

8. The radiographic intensifying screen as claimed in claim 1, in which said organotin compounds are compounds having the formula (III):

$$Y^1-\underset{\underset{Y^2}{|}}{\overset{\overset{R^5}{|}}{Sn}}-(X^2-\underset{\underset{Y^3}{|}}{\overset{\overset{R^6}{|}}{Sn}})_n-Y^4 \quad (III)$$

in which each of $R^5$ and $R^6$ is a hydrogen atom, an alkyl group or an aryl group, and $R^5$ and $R^6$ are the same or different from each other; each of $Y^1$, $Y^2$, $Y^3$ and $Y^4$ is an alkyl group, an aryl group, a fatty acid, a fatty acid derivative, mercaptan or a mercaptan carboxylic acid, and $Y^1$, $Y^2$, $Y^3$ and $Y^4$ are the same or different from each other; $X^2$ is an oxygen atom, a sulfur atom or a maleic acid; and n is 0 or an integer of not less than 1.

9. The radiographic intensifying screen as claimed in claim 1, in which said metal salts of organic acids are compounds having the formula (IV):

$$(R^7COO)_mM \quad (IV)$$

in which $R^7$ is an alkyl group or an aryl group having 1–20 carbon atoms, which may have at least one substituent; M is calcium, zinc, cadmium or barium; and m is a positive integer.

* * * * *